United States Patent [19]

Inoue et al.

[11] Patent Number: 4,607,578
[45] Date of Patent: Aug. 26, 1986

[54] POSITIONING MECHANISM

[75] Inventors: Hirochika Inoue, Tokyo; Ken-ich Yoshida, Osaka; Yasushi Kida, Osaka; Akira Takemoto, Osaka, all of Japan

[73] Assignee: Sumitomo Electric Industries Ltd., Osaka, Japan

[21] Appl. No.: 616,085

[22] Filed: Jun. 1, 1984

[30] Foreign Application Priority Data

Jun. 2, 1983 [JP] Japan .................................. 58-99203
Jun. 13, 1983 [JP] Japan ................................ 58-106301

[51] Int. Cl.⁴ ............................................... A47B 9/00
[52] U.S. Cl. ..................... 108/145; 33/568; 108/20; 248/179; 248/421; 269/61; 269/71
[58] Field of Search ............ 108/4, 136, 145, 20; 248/179, 421, 163.1, 396; 269/61, 71; 403/58; 33/174 TA, 174 TD, 1 N, DIG. 12, 568

[56] References Cited

U.S. PATENT DOCUMENTS

| | | | |
|---|---|---|---|
| 554,516 | 2/1896 | Huhle | 248/421 |
| 3,215,391 | 11/1965 | Storm | 248/396 |
| 3,229,941 | 1/1966 | Suliteanu et al. | 248/163.1 |
| 3,273,879 | 9/1966 | Floren | 269/61 |
| 3,288,421 | 11/1966 | Peterson | 108/4 X |
| 3,374,977 | 3/1968 | Moy, Jr. | 248/396 X |
| 3,419,238 | 12/1968 | Flory | 108/136 X |
| 3,456,943 | 7/1969 | Brown | 248/421 X |
| 3,765,631 | 10/1973 | Herbst et al. | 248/179 X |
| 4,374,497 | 2/1983 | Harmand | 108/4 |

FOREIGN PATENT DOCUMENTS

| | | | |
|---|---|---|---|
| 67709 | 6/1981 | Japan | 33/1 N |
| 598786 | 5/1978 | Switzerland | 108/4 |

Primary Examiner—William E. Lyddane
Assistant Examiner—James R. Brittain
Attorney, Agent, or Firm—Cushman, Darby & Cushman

[57] ABSTRACT

A positioning mechanism comprising three pantagraphs supporting a table on a base. Each pantagraph is constructed of four links connected into the form of a quadrilateral. The table is positioned to permit with six degrees of freedom by regulating the angle of inclination of each of the six lower links of the pantagraphs with respect to the base.

5 Claims, 4 Drawing Figures

POSITIONING MECHANISM

FIELD OF THE INVENTION

This invention relates to a positioning mechanism for moving and rotating a single structural element, such as a table, tool or a mechanism grasping an object, to a desired position in space and at a desired orientation, and for supporting the same at the desired position and orientation.

SUMMARY OF THE INVENTION

The object of the present invention is to provide a novel mechanism for moving a table having an article placed thereon or secured thereto to any position and orientation in space, and for maintaining the table in the stated position and orientation. A table of the type described finds use in supporting parts thereon so that the parts may be assembled automatically, in various automatic measurement operations by having a measurement probe secured thereto, and in many other applications. The table can also be used in the handling of an object since it is equipped with a mechanism for grasping the object. Tables of this kind include, e.g., a table for securing a workpiece in a machine tool, a table for scientific experiments, and an automatic handling apparatus. The conventional practice is to employ an ordinary table such as an XY table for these purposes.

For reasons that will be described and illustrated later in connection with FIG. 1, however, the conventional table positioning mechanism is disadvantageously large in size and weight in terms of the overall apparatus. The reasons for these disadvantages will now be described in general terms.

In order to provide six degrees of freedom for movement of an object in a positioning apparatus, six mutually independent sources of motive power are ordinarily required. The six degrees of freedom referred to are linear movement along each of three mutually perpendicular axes, and rotational movement about each of these three axes. The six power sources include a first power source for moving the object along the X axis, a second power source for moving both the object and the first power source along the Y axis, a third power source for moving the object, as well as the first and second power sources, along the Z axis, a fourth power source for rotating the object, as well as the first through third power sources, about the X axis, and so on through a sixth power source. It is obvious that the second power source is required to have a larger weight and capacity than the first, that the third power source is required to have a larger weight and capacity than the second, and so on. Without repeating the foregoing relationships with regard to the third, fourth, fifth and sixth power sources, it will be apparent that the sixth power source must be capable of bearing the total weight of the first through fifth power sources, and must have a capacity large enough to transport these other sources through space. The sixth power source inevitably is required to be large in size and weight.

The object of the present invention is to provide a novel positioning mechanism free from the aforementioned disadvantages encountered in the prior art.

BRIEF DESCRIPTION OF THE DRAWINGS

The above and other objects, features and advantages of the invention will be more apparent from the ensuing detailed description taken in connection with the accompanying drawings in which.

DETAILED DESCRIPTION OF THE PREFERRED EMBODIMENT

Figure 1:
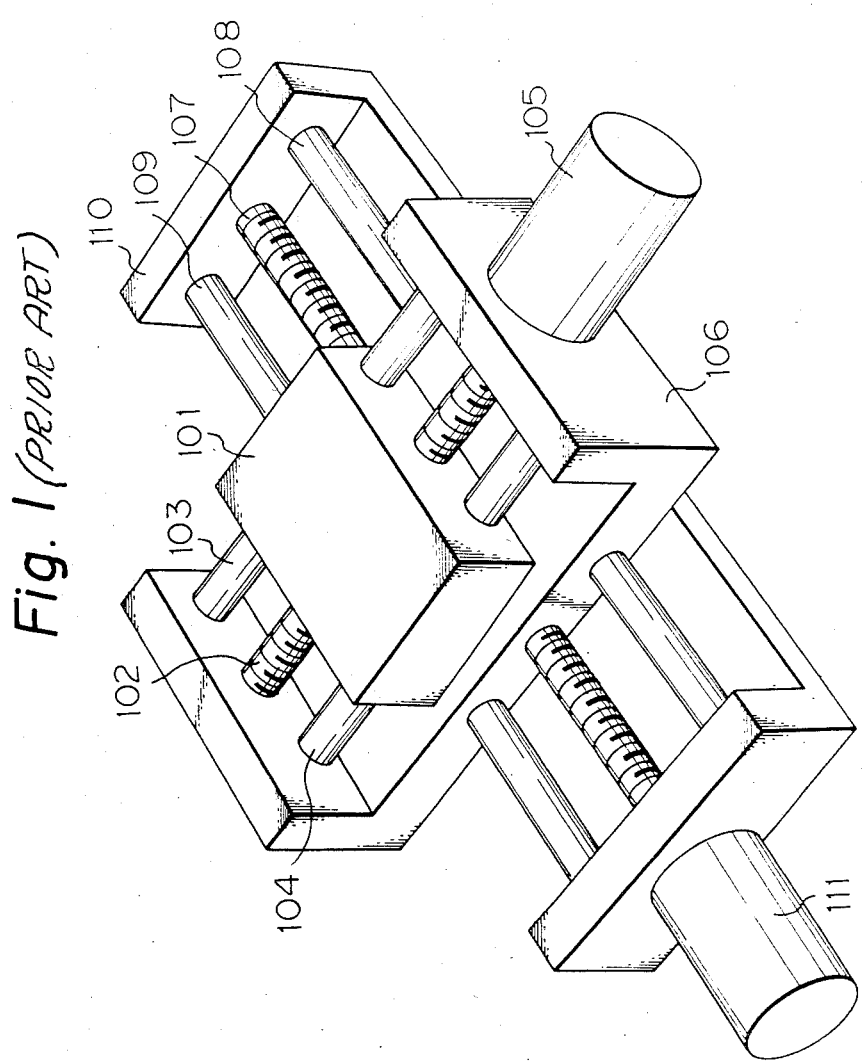
FIG. 1 is a perspective view illustrating a positioning mechanism according to the prior art.

Before describing a preferred embodiment of the present invention, reference will be had to FIG. 1 for a discussion of the construction, operation and disadvantages of one example of the prior art.

The example of a prior-art arrangement shown in FIG. 1 is one in which there are but two degrees of freedom in order to simplify the discussion of the problem. However, a configuration having six degrees of freedom may readily be analogized from the discussion that follows.

In FIG. 1, a housing 110 has shafts 108, 109 secured thereto in parallel relation, the shafts serving as guides for a second housing 106 adapted to slide therealong. A feed screw 107 for moving the second housing 106 has one end thereof coupled to a motor 111. When the shaft of the motor 111 is rotated by supplying the motor with electric power, the feed screw 107 is driven into rotation to transport the second housing 106 longitudinally of the shafts 108, 109. Attached to the second housing 106 for similar translational motion at right angles to the travelling direction of the second housing are parallel shafts 103, 104, a feed screw 102 and a motor 105. A table 101 is transported longitudinally of the shafts 103, 104 by the feed screw 102, which is coupled at one end to the motor 105 and rotated thereby.

In accordance with the principle of the illustrated example, an object secured to the table 101 can be moved to any point confined to a limited area in a plane. The position of the table can be controlled by an electrical signal by adopting a feedback control system wherein a rotational angle sensor is mounted on each of the motor shafts and outputs from the sensors are applied to servo circuits controlling the respective motor currents.

If a circuit for storing electrical signals is provided and position information indicative of a desired position is stored in the circuit, then the table can be moved automatically to one desired position after another. By securing a workpiece to the table, the workpiece can be subjected to turning and cutting operations in two dimensions automatically even if the position of a tool performing the work is fixed. In another possible arrangement, a device for grasping and releasing an object can be secured to the table, whereby the object can be carried from one location to another automatically. A mechanism capable of moving a single structural element (e.g., the table in the illustrated example) to a desired special position and of supporting the element at that position in the foregoing manner is referred to as a positioning mechanism.

The illustrated arrangement is capable of achieving positioning solely in a predetermined plane. If it is desired to acquire motion in a direction at right angles to both sets of shafts 108, 109; 103, 104; namely in a direction (referred to as the "vertical" direction hereinafter) orthogonal to the plane defined thereby, then a mechanism for transporting a second table in the vertical direction is secured to the table 101 and the second table is used for positioning in this direction. Where it is necessary to change the angular orientation of the tables, mechanisms are similarly attached for rotating the tables through the desired angles.

The disadvantages of the conventional positioning mechanism may be summarized as follows. Specifically, the load imposed upon a source of motive power for movement associated with a certain degree of freedom is not merely the weight of the object being moved but includes also the weight of motive power sources for movement associated with the other degrees of freedom as well as the weight of the equipment for supporting these power sources. The overall apparatus is therefore large in size and weight. In the example of FIG. 1, the load borne by the motor 111 includes not only the table 101 desired to be moved but also the motor 105, housing 106, shafts 103, 104 and feed screw 102. Accordingly, the load acting upon the motor 111 is extreme. This makes it impossible to achieve rapid acceleration and deceleration and necessitates the use of very large motors. An unfortunate consequence is an overall reduction in travelling speed, a tendency which becomes more pronounced as the degrees of freedom increase.

The present invention provides a positioning apparatus which is free of the above-described drawbacks.

The general features of a positioning mechanism in accordance with the present invention will now be described in conjunction with the diagrammatic view of FIG. 2.

Figure 2:
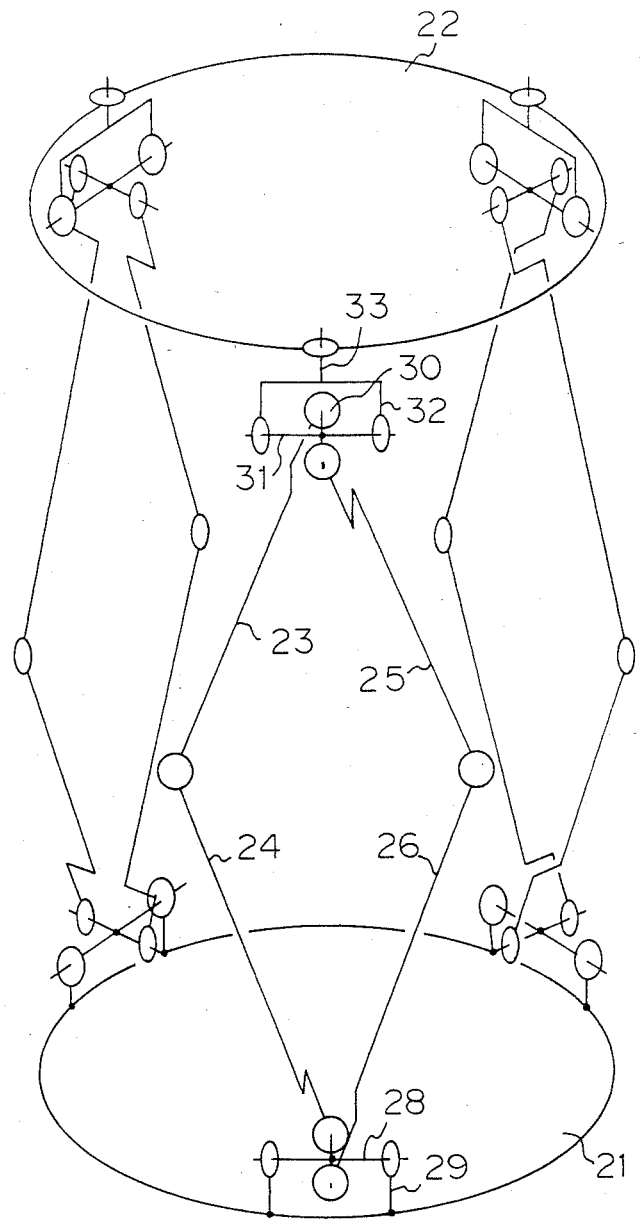
FIG. 2 is a view diagrammatically illustrating the construction of the present invention.

The purpose of the arrangement shown in FIG. 2 is to move a travelling table 22 accurately to a desired position with respect to a base 21, and to support the table at that position. To this end, the base 21 and travelling table 22 are coupled together by three pantagraph mechanisms each of which comprises two upper links and two lower links. Since the three pantagraph mechanisms are identical in construction, only one will be described. Four links 23, 24, 25, 26 are interconnected to form a quadrilateral in such a manner that two adjoining links are rotatable about a single shaft connecting these two links together. If the angle defined by any two adjoining links is decided, then this will decide the shape of the quadrilateral as well as the length of the diagonals thereof. Changing the three angles defined by the six lower links will change the positions and the shapes of the three quadrilaterals.

Figure 3:
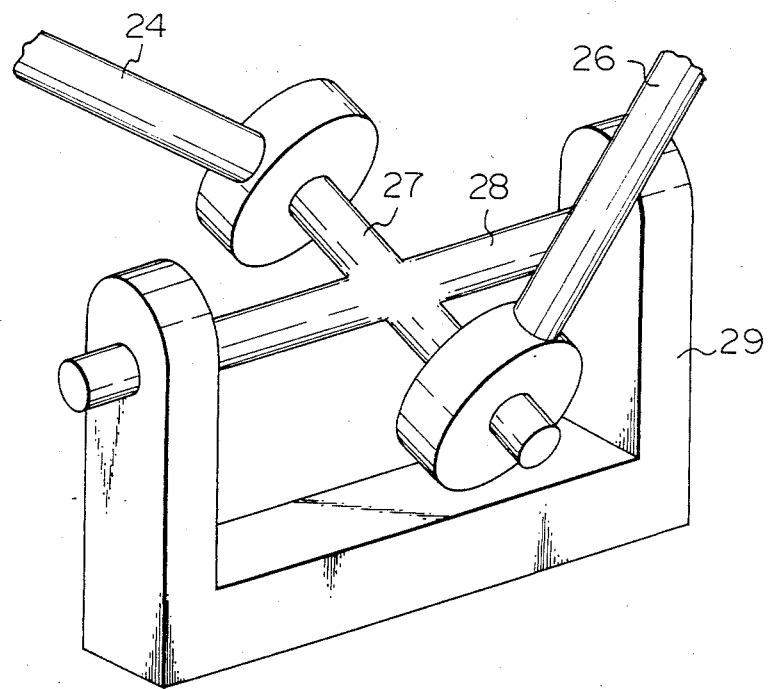
FIG. 3 is a perspective view showing an embodiment of a shaft connection between two adjoining links of a pantagraph mechanism which serves to illustrate one of the characterizing features of the present invention.

FIG. 3 shows in enlarged form an example of the detailed construction of a portion of the pantagraph where adjoining lower links 24, 26 are interconnected by a shaft 27. The connecting shaft 27 is formed to include a shaft 28 orthogonal thereto, the shaft 28 being rotatably supported at both ends thereof by a bracket 29 secured to the base 21.

Returning to FIG. 2, a rotary shaft 30 interconnecting the adjoining upper links 23, 25 is formed to include a shaft 31 orthogonal thereto, the shaft 31 being rotatably supported at both ends thereof by a bracket 32. The latter is attached to the travelling table 22 so as to be freely rotatable about a shaft 33 orthogonal to both of the shafts 30, 31. The lower link 26 is driven by a source of motive power (FIG. 4) in such a manner as to be capable of producing turning effort about the shaft 27. Likewise, the lower link 24 is driven by another source of motive power in such a manner as to be capable of producing turning effort about the shaft 27. Thus, the lower links 24, 26 are driven in such a manner that the angle formed by the lower link 24 with respect to the shaft 28, as well as the angle formed by the lower link 26 with respect to the shaft 28, can be changed independently of each other.

The other rotating portions of the pantagraph need only be rotatable passively by externally applied force. In other words, a single pantagraph mechanism has two sources of motive power, so that the overall mechanism, which is composed of three pantagraphs, has a total of six motive power sources. By using these six power sources to change the angles between the adjoining lower links driven thereby, the position and orientation of the travelling table relative to the base 21 can be changed.

Positional control can be achieved by measuring the angle of a driven lower link through adoption of suitable means and feeding back the measured value. Moreover, the travelling table 22 can be fixed in position if the angle of each link driven by the respective source of motive power is fixed by positioning control. This enables the traveling table to be moved to a desired point within a three-dimensional range of allowable movement, and to be supported at that point. The orientation or inclination of the table 22 relative to the base 21 can be changed and the table can be supported at the angle of inclination.

Figure 4:
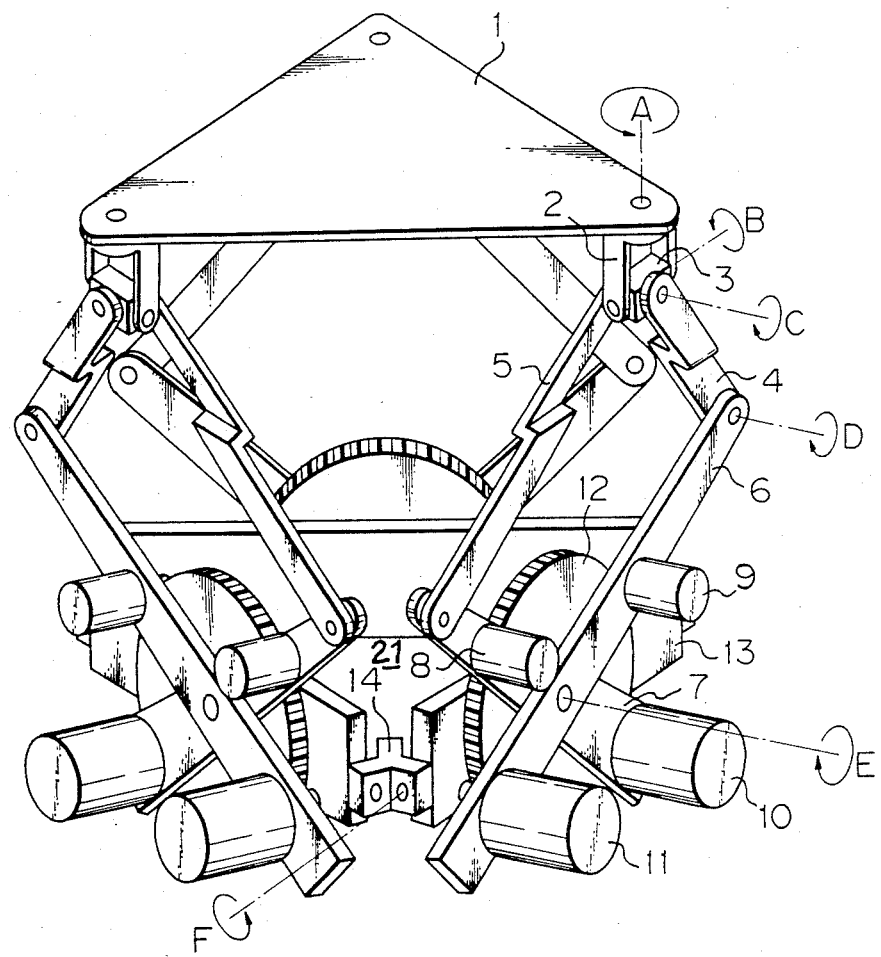
FIG. 4 is a perspective view illustrating an embodiment of the present invention.

An embodiment of a positioning apparatus according to the present invention will now be described with reference to FIG. 4. FIG. 4 includes the sources of motive power not shown in FIG. 2.

A table 1 is shown to be supported in space. A coupling retainer 2 is attached to the table 1 so as to be freely rotatable about an axis A orthogonal to the plane of the table. A coupling 3 is retained by the coupling retainer 2 so as to be freely rotatable about an axis B lying parallel to the plane of the table. Upper links 4, 5 are attached to the coupling 3 so as to be freely rotatable independently of each other about an axis C orthogonal to the axis B, which is the axis about which the coupling 3 is freely rotatable with respect to the coupling retainer 2. The upper link 4 is connected to a lower link 6 so as to be freely rotatable about an axis D, which lies parallel to the axis C. The upper link 5 is similarly connected to a lower link 7. The lower links 6, 7 are attached to each other so as to be freely rotatable about an axis E, which lies parallel to the axes C and D. The axis E occupies a position which is fixed with respect to a gear mounting plate 13. Secured to the gear mounting plate 13 is a main gear 12 which lies perpendicular to the axis E and whose central axis coincides with the axis E. A motor 11 secured to the lower link 6 has a shaft to which a gear, not shown, is affixed. The gear meshes with the main gear 12 and undergoes planetary motion about the main gear. Also secured to the lower link 6 is a potentiometer 9 having a shaft to which a gear, not shown, is affixed. This gear also meshes with the main gear 12 and undergoes planetary motion thereabout. A motor 10 secured to the lower link 7 has a shaft to which a gear, not shown, is affixed. This gear meshes with the main gear 12 for planetary motion with respect thereto. The lower link 7 has a potentiometer 8 secured thereto. A gear, not shown, is secured to the shaft of the potentiometer 8 and meshes with the main gear 12 for planetary motion thereabout. The gear mounting plate 13 is supported at one end by a support member 14 and at the other end by a similar support member, not shown, so as to be freely rotatable about an axis F. The support member 14 and the support members similar thereto but not shown are, in turn, fixed to base 21 as was described in connection with the schematic of FIG. 2. The upper links 4, 5 and lower links 6, 7 thus construct a quadrilateral. Hereinafter the distance between the axes E and C will be referred to as the length of the diagonal line of the quadrilateral, and the angle defined by the diagonal line and the axis F will be referred to as the angle of inclination of the diagonal line.

In operation, the motors 10, 11 are supplied with electric power to drive their respective shafts into rotation, thereby changing the angles of the lower links 6, 7 with respect to the main gear 12, as well as the length and angle of inclination of the diagonal line. The angle through which the lower link 6 rotates with respect to the main gear 12 is measured by rotation of the potentiometer 9. Similarly, the rotational angle of the lower link 7 with respect to the main gear 12 is measured by rotation of the potentiometer 8. By using the results of these measurements to effect feedback control, the angle of inclination each of the lower links can be controlled automatically at will.

In general, the position and orientation of the table 1 in space can be provided with a maximum of six degrees of freedom. To fix the position and orientation of a table having the maximum degrees of freedom, therefore, it is required that all six degrees of freedom be regulated and fixed. Among the six degrees of freedom possessed by the table, two of them can be regulated by one of the quadrilateral link mechanisms which, as described above, is capable of having the length of its diagonal line and the inclination angle thereof controlled. Accordingly, if the similarly constructed link mechanisms provide three-point support, then a limitation can be imposed on the total of six degrees of freedom, thereby allowing the position and orientation of the table to be freely adjusted and fixed. If the angles of the six lower links of the three pantagraphs are measured based on outputs from the six respective potentiometers, and if the measured values are fed back to control the manner in which the motors are driven, then the table can be made to occupy any position and angle of inclination within a given range, and the table can be fixedly supported at that position and angle.

A positioning mechanism in accordance with the present invention has the following advantages:

(a) A source of motive power for drive within a certain degree of freedom, and the equipment for supporting the source of motive power, do not constitute a load with respect to a source of motive power for drive within another degree of freedom. The outputs of all sources of motive power act cumulatively to support the load which is the object of the positioning operation. Therefore, regardless of the smaller size and weight of the apparatus, the invention makes it possible to support and move a very heavy object.

(b) The six sources of motive power all have an identical construction. This greatly reduces the variety of component parts, facilitates manufacture and, hence, lowers manufacturing costs.

As many apparently widely different embodiments of the present invention can be made without departing from the spirit and scope thereof, it is to be understood that the invention is not limited to the specific embodiments thereof except as defined in the appended claims.

What is claimed is:

1. A positioning apparatus comprising a table, a base, and three pantagraph means for supporting said table at three connection points in spaced relation to said base, each said pantagraph means including:
   a pair of upper links,
   a pair of lower links,
   means for pivotally connecting a lower end portion of each said upper link to an upper end portion of a respective one of said lower links;
   upper support means for operatively connecting an upper end portion of each said upper link to a respective one of said table connection points, said upper support means including (a) an upper coupling member having a pair of mutually orthogonal axles respectively defining first and second upper pivot axes which are, in turn, mutually orthogonal to one another and which are parallel to a plane of said table, said upper end portion of each said upper link being connected to a first one of said axles for pivotal movements about said upper first axis, (b) a coupling retainer connected to a second one of said axles for pivotal movements about said second upper axis, and (c) means for connecting said coupling retainer to said table at said respective one of said table connection points for pivotal movements of said coupling retainer, and thus said pairs of upper and lower links, about an axis orthogonal to said table plane; and
   lower support means for operatively connecting a lower end portion of each said lower link to said base, said lower support means including (i) first shaft means defining a first lower pivot axis, parallel to said first upper pivot axis, for connecting said lower end portions of each said lower link to said base for pivotal movements about said first lower axis, and (iv) second shaft means defining a second lower pivot axis, orthogonal to said first lower axis but parallel to said second upper axis, for connecting said lower end portions of each said lower link to said base for pivotal movements also about said second lower axis, wherein
   said upper and lower pairs of links form a quadrilateral structure such that said three pantagraph means permit said table to be positionable within six degrees of freedom by selective regulation of inclination angles of said pairs of lower links relative to said base.

2. A positioning apparatus according to claim 1 further comprising three support members pivotal about three respective axes parallel to the base, three main gears each fixedly attached to a respective one of said support members, a pair of planetary gears each attached to a respective said lower link and with a respective one of said main gears, motor means provided for each said planetary gear for driving said planetary gear, and rotational angle measuring means for measuring an angle of rotation, relative to the respective one of said main gears, of each said lower link which, in pairs, form three lower corner portions of said quadrilateral structures of said pantagraph means.

3. A positioning apparatus as in claim 1 wherein each said lower support means includes a pair of support members fixed to said base and a mounting member, wherein said first shaft means pivotally connects said lower end portions of said pair of lower links to said mounting member and wherein said second shaft means pivotally connects said mounting member to each said support member.

4. A positioning apparatus as in claim 3 wherein each pantagraph means further includes drive means for independently driving each said lower link to selectively vary said inclination angles thereof.

5. A positioning apparatus as in claim 4 wherein said drive means includes:
- a main gear fixed to said mounting member;
- a pair of planetary gears each pivotally connected to a respective one of said lower links and each intermeshed with said main gear; and
- motor means connected to said pair of planetary gears for selectively independently rotating said pair of planetary gears to thereby selectively vary said inclination angle of said pair of lower links.

* * * * *